United States Patent [19]

Kobayashi

[11] Patent Number: 4,932,012
[45] Date of Patent: Jun. 5, 1990

[54] METHOD FOR REGENERATING INFORMATION FROM A MAGNETO-OPTICAL INFORMATION RECORDING MEDIUM

[75] Inventor: Tadashi Kobayashi, Yokohama, Japan

[73] Assignee: Canon Kabushiki Kaisha, Tokyo, Japan

[21] Appl. No.: 147,075

[22] Filed: Jan. 20, 1988

Related U.S. Application Data

[62] Division of Ser. No. 938,285, Dec. 5, 1986, abandoned.

[30] Foreign Application Priority Data

Dec. 9, 1985 [JP] Japan .................................. 60-275117

[51] Int. Cl.$^5$ ...................... G11B 11/12; G11B 13/04
[52] U.S. Cl. ...................................... 369/13; 360/114
[58] Field of Search ...................... 369/13; 360/59, 114; 365/122, 10

[56] References Cited

U.S. PATENT DOCUMENTS

| | | | |
|---|---|---|---|
| 4,518,657 | 5/1985 | Yanagida | 427/131 |
| 4,628,485 | 12/1986 | Tanaka et al. | 365/122 |
| 4,645,722 | 2/1987 | Katayama et al. | 428/694 |
| 4,799,114 | 1/1989 | Tsunashima | 360/59 |

FOREIGN PATENT DOCUMENTS

| | | |
|---|---|---|
| 51296 | 5/1982 | European Pat. Off. . |
| 153546 | 11/1981 | Japan . |
| 195344 | 12/1982 | Japan . |
| 108045 | 6/1983 | Japan . |
| 101744 | 6/1985 | Japan . |
| 87249 | 5/1986 | Japan . |

OTHER PUBLICATIONS

S. Tsunashima et al., *Thermomagnetic Writing on Multi-layered Amorphous Rare-Earth Iron Films,* 5 Japan Applied Magnetics Scientific Journal 73 (1981).
T. Kobayashi, *Treatise on Amorphous Rare-Earth Transition-Metal Alloy Films, and Magnetic and Magnetooptic Effects of That Multilayered Films* (Nagoya Univ., 1985).
Takenonchi et al, "Magneto-Optical Characteristics of Double-Layered Amorphous RE-Fe Films by RF Sputtering" J. Appl. Phys. 55(6), 15 Mar. 1984, p. 2164.

*Primary Examiner*—Steven L. Stephan
*Assistant Examiner*—Hoa T. Nguyen
*Attorney, Agent, or Firm*—Fitzpatrick, Cella, Harper & Scinto

[57] ABSTRACT

There is disclosed a magnetooptical recording medium provided with at least a recording layer and a reading layer both composed of magnetic layers showing vertical magnetic anisotropy, in which the recording layer has a higher coercive force and a lower Curie temperature than those of the reading layer at room temperature, wherein the thickness of the recording layer is 1/10 to 1/1000 of the diameter of the magnetic domain formed in the recording layer by information recording, and the reading layer is so positioned with respect to the recording layer that a floating magnetic field emanating from the magnetic domain in the recording layer shows positive and negative peaks in the reading layer in the vicinity of the boundary of the magnetic domain. Secure regeneration of information with a high S/N ratio is possible from such recording medium by irradiating the reading layer with light while applying a magnetic field of which magnitude is larger than the coercive force of the reading layer, smaller than that of the recording layer and smaller than the peak value of the floating magnetic field emanating from the recording layer, and detecting the regenerating light modulated in polarization according to the direction of magnetization of the reading layer.

4 Claims, 4 Drawing Sheets

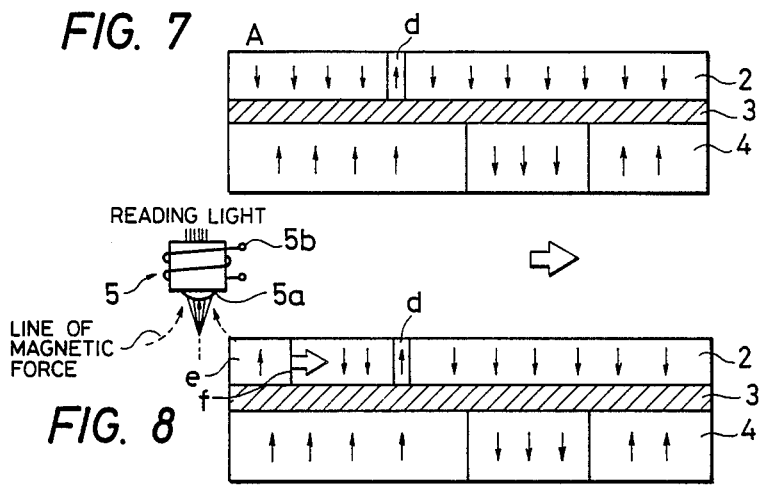
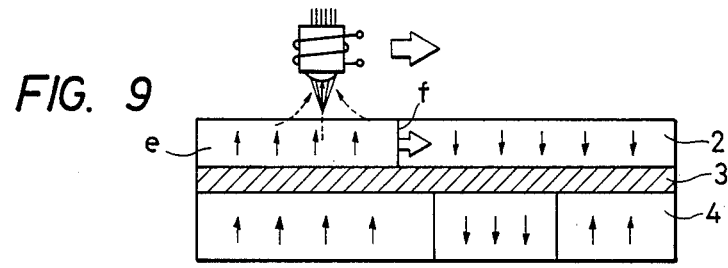
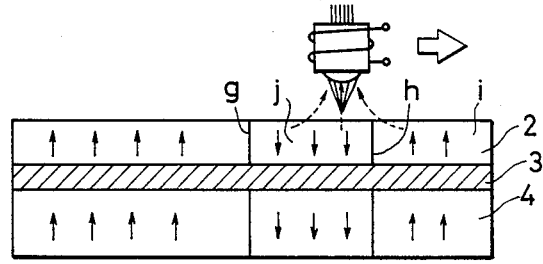

FIG. 11
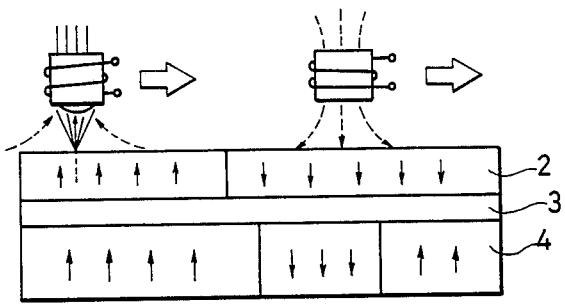
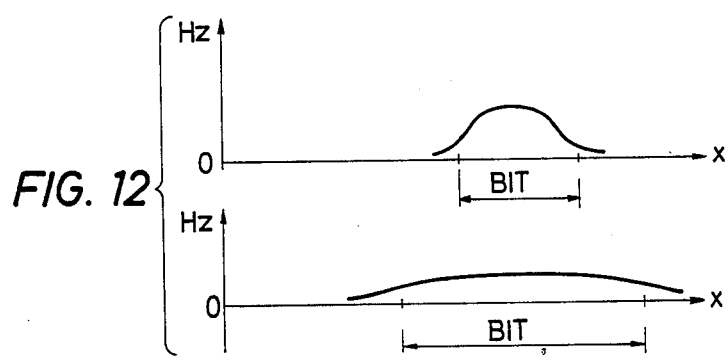
FIG. 12
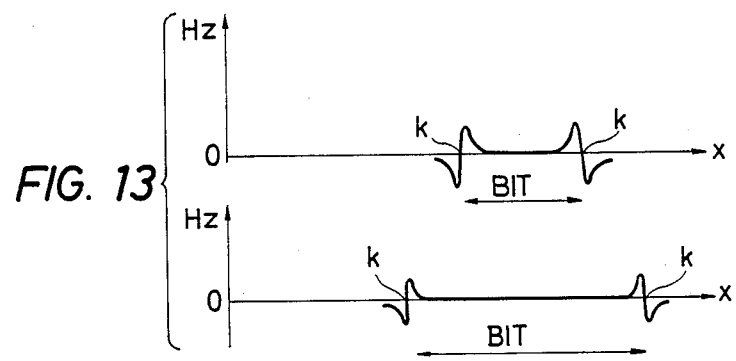
FIG. 13

METHOD FOR REGENERATING INFORMATION FROM A MAGNETO-OPTICAL INFORMATION RECORDING MEDIUM

This application is a division, of application Ser. No. 938,285 filed Dec. 5, 1986, now abandoned.

BACKGROUND OF THE INVENTION

1. Field of the Invention

The present invention relates to a magnetooptical information recording medium and a method for regenerating information from said medium.

2. Related Background Art

There are already known magnetooptical information recording media utilizing a polycrystalline thin layer for example of MnBi or MnCuBi, an amorphous thin layer for example of GdCo, GdFe, TbFe, DyFe, GdTbFe or TbDyFe, or a crystalline thin layer for example of GIG. Among these materials, a thin layer of rare earth transition metal amorphous alloys is recently considered adequate for producing a magentooptical information recording medium, in consideration of ease of producing a thin layer of a large area at a temperature close to the normal temperature.

In general, the magnetooptical information recording medium is required to show a high recording sensitivity, a large magnetooptical effect and a high coercive force. However it has been difficult to meet all these requirements with any of the above-mentioned thin layers alone. For example GdCo or GdFe, allowing compensation point recording, shows a large magnetooptical effect at information reading and provides a high S/N ratio due to a relatively high Curie temperature, but shows a low coercive force so that the recorded domains are unstable. On the other hand, TbFe or DyFe allowing Curie point recording is not associated with the above-mentioned drawbacks because of a relatively high coercive force, but provides a low S/N ratio at information reading due to the low Curie temperature. In order to avoid these drawbacks, there is proposed, for example in the Japanese Patent Laid-open No. 153546/1981 etc., a magnetooptical information recording medium of a two-layered structure in which a reading layer with a large magnetooptical effect and a low coercive force is magnetostatically combined with a recording layer with a low Curie temperature and a high coercive force. In this medium, the domains recorded in the recording layer are transferred, by magnetostatic coupling, to the reading layer, from which the information is read by a magnetooptical effect.

However, in such two-layered magnetooptical information recording medium, the magnetostatic coupling achieved by an interaction of the domains in said layers through a floating magnetic field and is locally limited to the portion where the domains exist, so that the stability of direction of magnetization of the recording layer is questionable where the recording layer does not have domains. Also the magnitude of the floating magnetic field resulting from the domains of the recording layer is often insufficient for transferring domains in the reading layer.

SUMMARY OF THE INVENTION

In consideration of the foregoing, the object of the present invention is to provide a magnetooptical information recording medium excellent in stability of information storage and allowing exact regeneration of said information, and a method for information regeneration therefrom.

The above-mentioned object can be achieved, according to the present invention, by a magnetooptical information recording medium provided at least with a recording layer and a reading layer, both composed of magnetic layers showing a perpendicular magnetic anisotropy, in which said recording layer has a higher coercive force and a lower Curie temperature than those of said reading layer at room temperature, wherein the thickness of said recording layer is selected from 1/10 to 1/1000 of the diameter of the domains formed by information recording in said recording layer, and said reading layer is formed in such position with respect to said recording layer that a floating magnetic field generated by the domain of said recording layer has a distribution showing positive and negative two peaks in the reading layer at the vicinity of boundary of said domain.

Also accurate regeneration of information with a high S/N ratio is possible from such magnetooptical information recording medium, by irradiating said recording medium with a regenerating light while applying, said reading layer, a magnetic field which is larger than the coercive force of the reading layer but smaller than the coercive force of the recording layer and smaller than the peak value of the floating magnetic field emanating from the recording layer, and detecting the regenerating light modulated in the state of polarization according to the direction of magnetization of the reading layer.

BRIEF DESCRIPTION OF THE DRAWINGS

FIGS. 6 to 10 are schematic views showing the process of regenerating the magnetooptically recorded information according to the present invention;

FIG. 11 is a schematic view showing another embodiment of the regenerating process according to the present invention; and FIGS. 12 and 13 are charts showing the change in the distribution of floating magnetic field as a function of the thickness of the recording layer.

DETAILED DESCRIPTION OF THE PREFERRED EMBODIMENTS

At first there will be explained data on the magnitude of an external floating magnetic field emanating from a cylindrical magnetic domain present in a magnetic layer, said data being the basis of the present invention.

Figure 1:
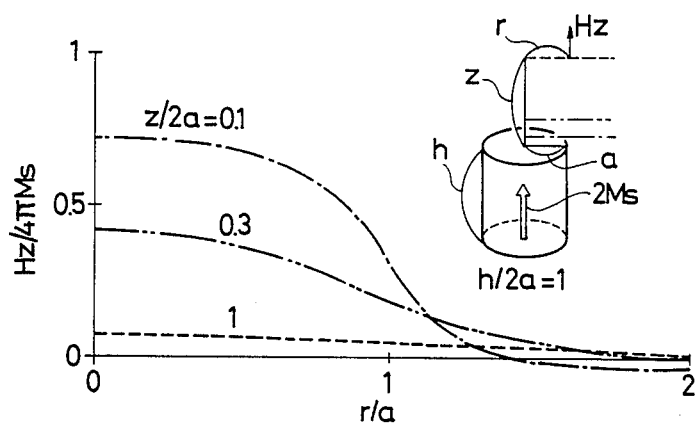
FIGS. 1 and 2 are charts showing an external floating magnetic field generated by a magnetic domain recording in a magnetic layer.
Figure 2:
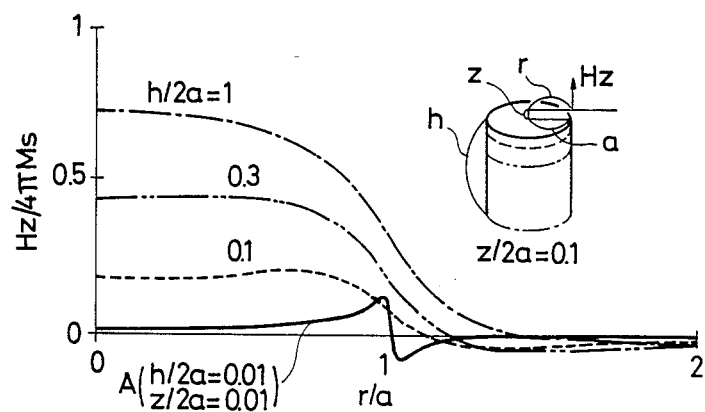

FIGS. 1 and 2 show the magnitude of an external floating magnetic field emanating from a cylindrical magnetic domain of a radius a, present in a magnetic layer of a thickness h and a magnetization $M_s$, said magnitude being represented by the z-component $H_z$, divided by $4\pi M_s$, of the magnetic field at a point distant by r from the center of the domain and by z from the surface thereof, as a function of r/a. FIG. 1 shows a case of h/2a=1, and z/2a is taken as a parameter. In case of z/2a=1, the value of Hz/4π Ms is quite small and shows little change as a function of r/a. Under such condition the floating magnetic field is weak and is unable to transcribe the magnetic domains in the reading layer present on the magnetic layer. On the other hand, in a condition z/2a=0.1, the transcription of magnetic domains is possible, but the stability of magnetic domains of the reading layer positioned on the recording layer where the magnetic domains are absent is questionable. More specifically, if no magnetic domain is present in the recording layer, there is no floating magnetic field influencing the reading layer so that said reading layer remains as an unstable recording medium with a low coercive force. Consequently, in the presence of an external magnetic field, the reading layer will generate magnetic domains irrelevant from the recorded information, thus resulting a reading error. FIG. 2 shows a case of z/2a=0.1, and h/2a is taken as the parameter. In case of h/2a=0.01 and z/2a=0.01 indicated by a solid line, the value Hz/4π Ms shows positive and negative two peaks around r=a, and varies rapidly at r=a from positive to negative. Under such condition the transcription of magnetic domains to the reading layer is not possible, but the magnetic wall generated in the reading layer can be stabilized between the peaks of the magnetic field emanating from the recording layer.

The present invention, which will be detailedly explained in the following, has been attained by utilizing such particular behavior of the magnetic field under such condition.

Figure 3:
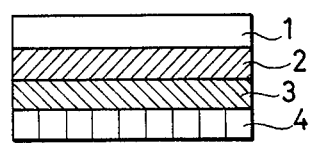
FIG. 3 is a schematic cross-sectional view of a magnetooptical information recording medium embodying the present invention.

FIG. 3 is a schematic cross-sectional view of an embodiment of the magnetooptical information recording medium of the present invention, which is composed of a transparent substrate 1, a reading layer 2, a non-magnetic layer 3 and a recording layer 4 superposed in this order.

The reading layer 2 is composed of a vertically magnetizable layer with a good reading characteristic, a low coercive force and a high Curie temperature, such as Gd—Fe, Gd—Co, Gd—Fe—Co, Gd—Fe—Co—Bi or a magnetic garnet. On the other hand, the recording layer 4 is composed of a vertically magnetizable layer with a Curie temperature suitable for thermomagnetic recording and a high coercive force, such as Tb—Fe, Tb—Fe—Co, Dy—Fe or Dy—Fe—Co. The non-magnetic layer 3 is provided for preventing quantum mechanical interaction between the reading layer 2 and the recording layer 4 and is not essential. Said non-magnetic layer 3 may be composed of any non-magnetic material, for example a dielectric material such as SiO or $SiO_2$, or a metal such as aluminum.

In the magnetooptical information recording medium shown in FIG. 3, the thickness of the recording layer 4 is selected in a range from 1/10 to 1/1000 of the diameter of a magnetic domain formed by recording. In such range there are obtained conditions similar to h/2a=0.01 and z/2a=0.01 shown in FIG. 2, whereby the floating magnetic field emanating from the magnetic domain shows a distribution with two positive and negative peaks in the reading layer in the vicinity of the boundary of said domain. More specifically, the curve A in FIG. 2 corresponds to a case where the thickness of the recording layer 4 is 1/100 of the diameter of the magnetic domain.

A suitable protective layer may be provided between the transparent substrate 1 and the reading layer 2, or on the recording layer 4. Also the recording medium may be constructed in the order of the substrate, recording layer and reading layer, if the information reading is not conducted through the transparent substrate.

In the following there will be explained a process of information recording and regeneration of the present invention, utilizing the above-described magnetooptical information recording medium.

(1) Recording Process

Figure 4:
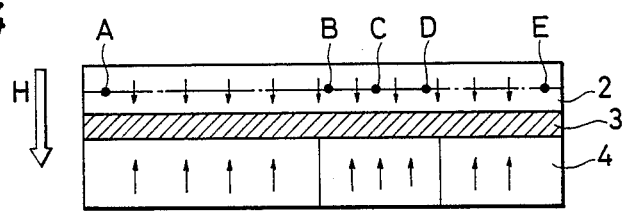
FIG. 4 is a schematic view showing the state of domain formation in the medium shown in FIG. 3.

For this purpose there can be employed an ordinary thermomagnetic recording process, without any special apparatus. Referring to FIG. 4, information recording is achieved by applying a downward magnetic field H to the recording layer 4 and simultaneously supplying thermal energy only to a portion X of the recording layer 4. Because of the structure of the magnetooptical information recording medium, the floating magnetic field Hz in the vicinity of a chain line in the reading layer 2 shown in FIG. 4 (floating magnetic field resulting from a bit in the recording layer) assumes a form shown in FIG. 5, wherein the abscissa indicates the position in the reading layer 2 in the horizontal direction. At a point A or E considerably distant from the recorded magnetic domain, the reading layer 2 scarcely receives the floating magnetic field from the recording layer 4. Also a point C corresponding to the center of the magnetic domain scarcely receives the floating magnetic field. On the other hand a point B or D corresponding to the boundary of the magnetic domain receives the floating magnetic field of a distribution with positive and negative peaks.

Figure 5:
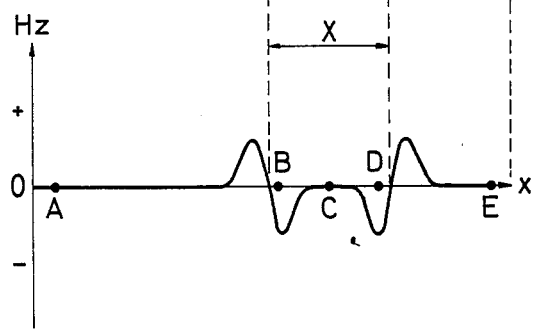
FIG. 5 is a chart showing the distribution of intensity, in the reading layer, of the floating magnetic field generated by the domains shown in FIG. 4.
Figure 6:
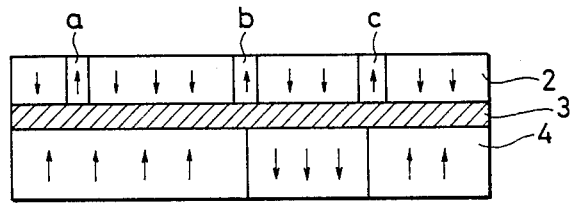

A magnetooptical information recording medium generating a floating magnetic field as shown in FIG. 5 can hardly transcribe the magnetic domain to the reading layer 2, of which magnetization is directed downwards by an external magnetic field. The transcription, even if achieved, takes place only in the vicinity of the boundary of the domain, as shown by b and c in FIG. 6. Also the coercive force of the reading layer has to be selected low in order to facilitate transcription of magnetization at signal regeneration, but an excessively low coercive force will result in the formation of a domain irrelevant to the recorded information, as shown by a, under the influence of an eventual external magnetic field.

(2) Regenerating Process

Ordinary regenerating process, for reading the information of the reading layer 2 by the irradiation with laser light alone, cannot regenerate information in this case, since the magnetization of the recording layer 4 is not transcribed to the reading layer 2.

Therefore the regeneration according to the present invention is achieved by irradiating the reading layer 2 with light while applying an upward magnetic field to said layer, and detecting the light from said reading layer 2. The details of this regenerating process will be explained, taking an example of regenerating information from a recording medium of a magnetization as shown in FIG. 7, obtained through the above-explained recording procedure. It is assumed that, as shown in FIG. 7, the magnetic domains are not transcribed to the reading layer 2, and an error domain has been generated therein.

The regeneration is conducted with an optical head 5 simultaneous with the application of an upward magnetic field from left to right. If the magnitude of said magnetic field is selected larger than the coercive force of the reading layer 2, there is generated an inverted magnetic domain e in the reading layer 2, and the magnetic wall f thereof proceeds from left to right with the movement of the optical head 5. Said optical head 5 detects the upward magnetization. The magnitude of the magnetic field is selected larger than the coercive force of the reading layer 2 in order to generate an inverted magnetic domain in an area which is irrelevant to recording, scarcely receiving the floating magnetic field from the recording layer 4, as represented by a point A.

The optical head 5 is provided with a lens 5a and a coil 5b, which can be same as a coil for generating a magnetic field at information recording.

When the magnetic wall f passes the position of the unnecessary domain d, it is absorbed in the inverted domain e and thus vanishes. Consequently, the optical head 5 exactly detects the upward magnetization also in this position. When the magnetic wall f reaches a point g in FIG. 10 corresponding to the boundary of the magnetic domains, the movement of the magnetic wall is prevented by the negative peak of the floating magnetic field shown in FIG. 5. Consequently the optical head 5 detects a downward magnetization. In order that the magnetic wall f can be stopped by the negative peak of the floating magnetic field, the magnitude of the externally applied magnetic field has to be smaller than the peak value of the floating magnetic field, since the magnetic wall f will move beyond the peak if said magnitude is larger than the peak value. In an area i without recorded bit, an inversion of magnetization takes place in the reading layer 2 by the movement of the magnetic wall, thereby transcribing the upward magnetization, which is detected by the optical head 5.

A magnetic field exceeding the coercive force of the reading layer is applied to the vicinity of center of the recorded bit transcribed to said reading layer, but the magnetization of said bit remains downward if the inversion of magnetization is effected by the movement of the magnetic wall.

It is also conceivable to apply a downward magnetic field to erase an unnecessary magnetic domain such as d prior to the regeneration, and then to effect the regeneration of information by applying an upward magnetic field as shown in FIG. 11. Since such unnecessary domain, if formed in an area corresponding to the magnetic domain of the recording layer 4, will hinder exact regeneration of information. The magnitude of such erasing magnetic field has also to be larger than the coercive force of the reading layer but smaller than that of the recording layer.

As explained above, the magnitude of the externally applied magnetic field at the regeneration has to be larger than the coercive force of the reading layer, smaller than that of the recording layer, and smaller than the peak value of the floating magnetic field emanating from the recording layer. For example, in case the reading layer and the recording layer are respectively composed of Gd—Fe—Co—Bi and Tb—Fe, said magnitude has to be larger than several ten Oe and smaller than several hundred Oe. In this manner the range of magnitude of the transcribing magnetic field is relatively wide, so that the transcription can be easily and securely achieved. Also it is possible to erase unnecessary magnetic domains eventually present in the reading layer, at the transcription of information thereto.

The reason for selecting the thickness of the recording layer considerably smaller than the diameter of the magnetic domain generated by recording will be apparent from the foregoing explanation and data, but it will be further clarified in the following.

A thicker recording layer will generate a floating magnetic field as shown in FIG. 12 with unclear boundary. Also the distribution of the floating magnetic field will vary with the diameter of the magnetic domain. Consequently the transcribed domain can hardly be of same size as that of the domain in the recording layer, and it may become smaller or larger or it may not be generated at all. On the other hand, a thin recording layer generates a magnetic field as shown in FIG. 13, of which positive and negative peaks are positioned very close to each other, and of which position R of zero magnetic field between the peaks almost exactly coincides with the boundary of the magnetic domain of the recording layer. Besides, these features vary scarcely regardless of the size of the magnetic domain. Consequently it is necessary to select the thickness of the recording layer considerably smaller than the diameter of the magnetic domain, thereby obtaining a distribution of the floating magnetic field as shown in FIG. 13.

As explained before, the thickness of the recording layer is selected within a range from 1/10 to 1/1000 of the diameter of the magnetic domain formed in said recording layer by information recording. The upper limit of 1/10 is selected because, in a curve of $h/2a=0.1$ in FIG. 2, the magnetic field component $H_z$ gradually increases as the ratio $r/a$ approaches 1 from 0 and the positive and negative peaks become evident when the thickness is reduced in this range. On the other hand, the positive and negative peaks become more parked at a smaller thickness, but the lower limit of 1/1000 is determined because the practical diameter of magnetic domain is several tens of microns at maximum. Consequently the thickness of the recording layer is selected within a range from ca. 100Å to several microns, preferably from several hundred microns to several thousand microns.

The thickness of the non-magnetic layer can be selected in the order of 100Å for preventing mutual coupling, and the magnetic field $H_z$ from the recording layer to the reading layer is little affected by a slight change in the thickness. Thus the distance between the recording and reading layers is suitably determined in consideration of this fact.

The present invention is not limited to the foregoing embodiments but is subject to various modification and application, within the scope and spirit of the appended claims.

What I claim is:

1. Process for reproducing information comprising:
    (a) Recording information on a magnetooptic recording medium having at least a recording layer and a reading layer both composed of a magnetic layers showing a vertical magnetic anisotropy, wherein said recording layer has a higher coercive force at room temperature and a lower Curie temperature than that of said reading layer, said recording layer being magnetized in a first direction a magnetic domain magnetized in a second direction, which is opposite to said first direction, such that the magnetic domain in said recording layer is not perfectly transferred to said reading layer and a floating magnetic field emanating from the magnetic domain in the recording layer which shows a distribution with negative and positive dual peak values in said reading layer in the vicinity of a boundary of said magnetic domain;

(b) irradiating said reading layer with a reproducing light while applying to said reading layer a magnetic field oriented in said first direction, said magnetic field having a magnitude larger than the coercive force of said reading layer, smaller than one of the peak values of said floating magnetic field; and (c) detecting said reproducing light whose polarization has been modulated according to the direction of magnetization of said reading layer, to reproduce said recorded information.

2. A process according to claim 1, further comprising a step of applying to said reading layer, prior to the irradiating step, a second magnetic field oriented in said second direction, the magnetic force of which being larger than the coercive force of said reading layer and smaller than that of said recording layer.

3. A process according to claim 1, wherein the thickness of said recording layer is selected from a range of 10 to 1000 times a diameter of said magnetic domain.

4. A process according to claim 1, wherein said recording layer is composed of GdFeCoBi, said recording layer is composed of TbFe, and said applied magnetic field oriented in said first direction is in a range of several tens to several hundreds Oersteds.

* * * * *

UNITED STATES PATENT AND TRADEMARK OFFICE
CERTIFICATE OF CORRECTION

PATENT NO. : 4,932,012
DATED : June 5, 1990
INVENTOR(S) : TADASHI KOBAYASHI

It is certified that error appears in the above-identified patent and that said Letters Patent is hereby corrected as shown below: Title page:

AT [56] REFERENCES CITED

Other Publications, "Takenonchi et al," should read
--Takenouchi et al,--.

COLUMN 1

Line 22, "magentooptical" should read --magneto-optical--.
Line 54, "achieved" should read --is acheieved--.

COLUMN 2

Line 24, "ing, said" should read --ing to said--.

COLUMN 3

Line 18, "resulting" should read --resulting in--.

COLUMN 5

Line 49, "information. The" should read
--information, the--.

COLUMN 6

Line 27, "i.n" should read --in--.

Line 57, "a" should be deleted.
Line 62, "direction a" should read --direction, by forming
with an external field and a recording light, a--.

UNITED STATES PATENT AND TRADEMARK OFFICE
CERTIFICATE OF CORRECTION

PATENT NO. : 4,932,012

DATED : June 5, 1990

INVENTOR(S) : TADASHI KOBAYASHI

It is certified that error appears in the above-identified patent and that said Letters Patent is hereby corrected as shown below:

COLUMN 7

Line 9, "than one" should read --then the coercive force of said recording layer and smaller than one--.

COLUMN 8

Line 10, "re-" should be deleted.
Line 11, "cording layer" should read --reading layer--.

Signed and Sealed this

Fourth Day of February, 1992

Attest:

HARRY F. MANBECK, JR.

Attesting Officer

Commissioner of Patents and Trademarks